United States Patent
Horita et al.

(10) Patent No.: US 10,400,873 B2
(45) Date of Patent: Sep. 3, 2019

(54) TORSIONAL VIBRATION DAMPER

(71) Applicant: TOYOTA JIDOSHA KABUSHIKI KAISHA, Toyota-shi, Aichi (JP)

(72) Inventors: Shuhei Horita, Numazu (JP); Hirotsugu Yoshino, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 708 days.

(21) Appl. No.: 15/057,232

(22) Filed: Mar. 1, 2016

(65) Prior Publication Data
US 2016/0258519 A1 Sep. 8, 2016

(30) Foreign Application Priority Data

Mar. 3, 2015 (JP) ................................. 2015-041358

(51) Int. Cl.
*F16H 45/02* (2006.01)
*F16F 15/14* (2006.01)
*F16H 45/00* (2006.01)

(52) U.S. Cl.
CPC ......... *F16H 45/00* (2013.01); *F16F 15/1457* (2013.01); *F16H 45/02* (2013.01); *F16H 2045/0221* (2013.01); *F16H 2045/0252* (2013.01); *F16H 2045/0263* (2013.01)

(58) Field of Classification Search
None
See application file for complete search history.

(56) References Cited

U.S. PATENT DOCUMENTS

| | | | | |
|---|---|---|---|---|
| 4,018,106 A * | 4/1977 | Uozumi | ................. | F16H 3/663 475/47 |
| 5,857,934 A * | 1/1999 | Ohkubo | ................ | F16H 47/085 475/36 |
| 6,066,058 A * | 5/2000 | Kashiwase | ................ | F16H 3/60 475/39 |
| 6,099,428 A * | 8/2000 | Kashiwase | ................ | F16H 3/60 475/210 |
| 8,939,859 B2 * | 1/2015 | Jawalkar Nagaraj | ... | F16H 41/04 475/35 |
| 9,074,655 B2 | 7/2015 | Hwang et al. | | |

(Continued)

FOREIGN PATENT DOCUMENTS

| | | |
|---|---|---|
| DE | 102012217171 A1 | 3/2014 |
| DE | 102014103274 A1 | 9/2014 |

(Continued)

*Primary Examiner* — Colby M Hansen
(74) *Attorney, Agent, or Firm* — Hunton Andrews Kurth LLP

(57) ABSTRACT

A torsional vibration damper that can be arranged in a fluid coupling to downsize a powertrain is provided. The torsional vibration damper has a mass body held in a rotary member in such a manner to be oscillated by torque pulse of the rotary member. The rotary member is arranged in an internal space of a fluid coupling in which a pump impeller, a turbine runner and a predetermined stationary member are held in a casing. A planetary unit that performs a differential action among three rotary elements is arranged in the casing. In the planetary unit, a first rotary element is connected to the stationary member, a second rotary element is connected to the rotary member, and a third rotary element is connected to the turbine runner.

4 Claims, 4 Drawing Sheets

(56) References Cited

U.S. PATENT DOCUMENTS

| | | | |
|---|---|---|---|
| 9,765,849 B2* | 9/2017 | Dieckhoff | F16F 15/13157 |
| 2008/0119316 A1* | 5/2008 | Ordo | F16H 47/085 475/59 |
| 2014/0274524 A1 | 9/2014 | Murakami | |

FOREIGN PATENT DOCUMENTS

| | | |
|---|---|---|
| JP | H10-184799 A | 7/1998 |
| JP | 2014-035078 A | 2/2014 |

* cited by examiner

TORSIONAL VIBRATION DAMPER

The present invention claims the benefit of Japanese Patent Application No. 2015-041358 filed on Mar. 3, 2015 with the Japanese Patent Office, the disclosures of which are incorporated herein by reference in its entirety.

BACKGROUND

Field of the Invention

The present invention relates to the art of a vibration damper for suppressing vibrations by an oscillating motion of an inertial mass, and especially to a torsional vibration damper used in a fluid coupling.

Discussion of the Related Art

JP-A-H10-184799 describes a motion absorber having a speed increasing mechanism as a planetary gear unit for increasing a revolution of a roller pendulum to enhance vibration damping performance. In turn, U.S. Pat. No. 9,074,655 describes an apparatus for damping a flywheel having a planetary gearing disposed between a crankshaft and a mass body.

The planetary gear unit performs a differential action among three rotary elements, and the planetary gear unit is allowed to serve as a speed increasing device by halting any one of the rotary elements. Preferably, the planetary gear unit of this kind is fitted into a powertrain of an automobile utilizing an inner space of the automobile efficiently to downsize the powertrain. To this end, the torsional vibration damper and the planetary gear unit may be arranged utilizing an available space for circulating fluid in a casing of a fluid coupling such as a torque converter. However, an art of incorporating the torsional vibration damper having the speed increasing device has not yet been developed in the prior art.

SUMMARY OF THE INVENTION

Aspects of the present invention have been conceived noting the foregoing technical problems, and it is therefore an object of the present invention is to provide a torsional vibration damper that can be arranged in a fluid coupling to downsize a powertrain.

The torsional vibration damper according to the preferred example comprises a mass body held in a rotary member in such a manner to be oscillated by torque pulse of the rotary member. In order to achieve the above-explained objective, in the torsional vibration damper according to the preferred example, the rotary member is arranged in an internal space of a fluid coupling in which a pump impeller, a turbine runner and a predetermined stationary member are held in a casing, and a planetary unit that performs a differential action among three rotary elements is also arranged in the casing. In the planetary unit, a first rotary element is connected to the stationary member, a second rotary element is connected to the rotary member, and a third rotary element is connected to the turbine runner.

In addition, a stator that alters a flowing direction of fluid flowing from the turbine runner toward the pump impeller is interposed between the turbine runner and the pump impeller, and the stationary member includes a fixed shaft supporting the stator.

For example, a single-pinion planetary gear unit comprising a sun gear, a ring gear arranged concentrically around the sun gear, and a carrier supporting planetary gears interposed between the sun gear and the ring gear may be employed as the planetary unit. In this case, the sun gear may be connected to the stationary member, the ring gear may be connected to the rotary member, and the carrier may be connected to the turbine runner.

Optionally, the mass body is enclosed liquid-tightly by a cover to be protected from the fluid in the casing.

Thus, according to the preferred example, the rotary member holding the mass body and planetary unit are held in fluid coupling, and the first rotary element of the planetary unit is connected to the stationary member. According to the preferred example, therefore, the planetary unit is allowed to serve as a speed change device to differentiate a rotational speed of the rotary member from that of the turbine runner, and a powertrain including the fluid coupling can be downsized entirely. In addition, the mass body, the rotary member, and the planetary unit may be lubricated by the fluid flowing through the fluid coupling. Further, gear noise and rattling noise generated between the rotary member and the mass body, and in the planetary unit may be suppressed.

Moreover, since the first rotary element is halted utilizing the existing fixed shaft supporting the stator, the first rotary member can be halted without arranging an additional fixing member so that the torque converter and the torsional vibration damper can be downsized.

Further, since the planetary unit serves as a speed increasing device, equivalent inertia of the mass body can be increased. For this reason, the mass body may be downsized to downsize the torque converter having the torsional vibration damper.

Furthermore, since the mass body is not subjected to resistance of the fluid, the mass body is allowed to oscillate accurately at the desired frequency. In addition, since the planetary unit serves as a speed increasing device, the rotational speed of the rotary member will not be dropped frequently to a level at which the collision noise of the mass body is caused. For this reason, the collision noise of the mass body may be suppressed.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
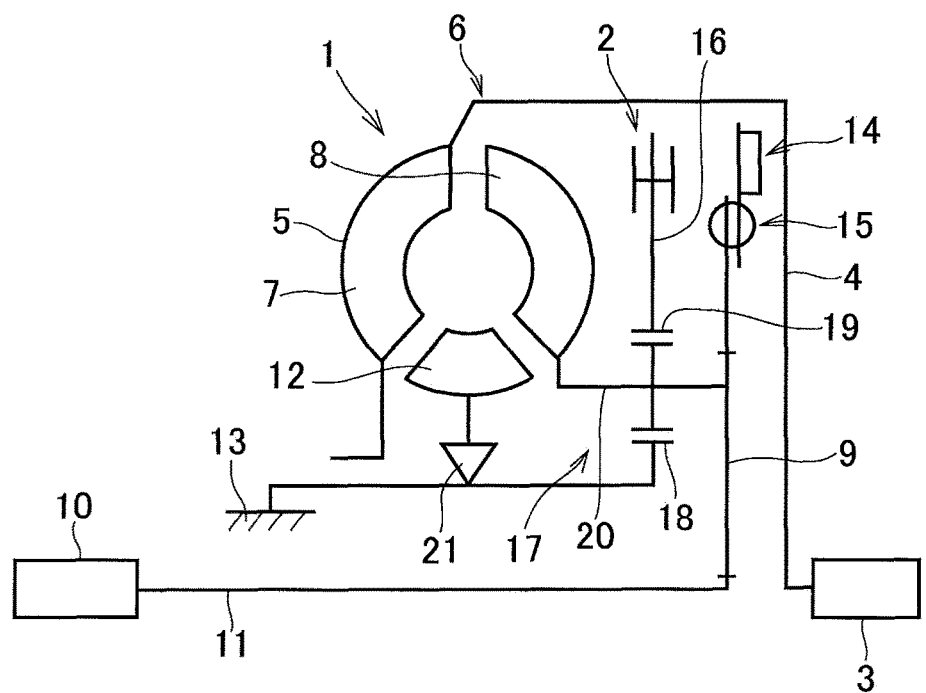
FIG. 1 is a skeleton diagram showing one example of the torsional vibration damper.

Preferred examples of the present invention will now be explained in more detail with reference to the accompanying drawings. Referring now to FIG. 1, there is shown one example of the torsional vibration damper in which a rotary member 16 and a mass body 2 for suppressing vibrations by an oscillating motion thereof are arranged in a fluid coupling such as a torque converter 1. In the torque converter 1, a casing 6 is formed by a front cover 4 connected to an output shaft (or a crank shaft) of an engine 3, and a pump shell 5 integrated with the front cover 4 in such a manner to keep the casing 6 in a liquid-tight condition. In order to enable torque transmission through the torque converter 1, fluid is encapsulated in the casing 6.

The pump shell 5 comprises a pump impeller 7, and a turbine runner 8 is opposed to the pump impeller 7. The turbine runner 8 is connected to an input shaft 11 of a transmission 10 through a hub 9. A stator 12 is interposed between the pump impeller 7 and the turbine runner 8 at an inner circumferential side. The stator 12 is adapted to alter orientation of the fluid delivered from the turbine runner 8 to the pump impeller 7. To this end, the stator 12 is connected to a predetermined stationary member 13 in the torque converter 1 through a one-way clutch 21.

A lock-up clutch 14 is connected to the hub 9 through a spring dumper 15 in such a manner to be opposed to an inner face of the front cover 4 as a part of the casing 6. Specifically, the lock-up clutch 14 is selectively brought into frictional contact to or isolated away from the inner face of the front cover 4 depending on a pressure difference between the front cover 4 side and the rotary member 16 side.

The mass body 2 is held in the rotary member 16 while being allowed to oscillate in a circumferential direction to suppress torque pulses on the turbine runner 8 and the input shaft 11 by an oscillating motion (i.e., a pendulum motion) of the mass body 2. To this end, specifically, a raceway surface is formed in the rotary member 16, and the inertial mass 2 centrifugally pushed onto the raceway surface is oscillated along the raceway surface by the torque pulses. Alternatively, the mass body 2 may also be attached to the rotary member 16 by a pin in a pivotal manner to suppress torque pulses by a pivotal motion of the mass body 2 around the pin.

Specifically, the rotary member 16 is interposed between the turbine runner 8 and the lock-up clutch 14 while being connected to the hub 9 or the input shaft 11 through a planetary gear unit 17. The planetary unit 17 is adapted to perform a differential action among three rotary elements such as a sun element placed at a rotational center, a ring element arranged concentrically around the sun element, and a carrier element supporting planetary elements interposed between the sun element and the ring element in a rotatable and revolvable manner. According to the preferred example, a planetary gear unit comprising a sun gear 18, a ring gear 19, and a carrier 20 is used as the planetary unit 17. The rotary element 16 is shaped into an annular plate, and engaged with an outer circumference of the ring gear 19. The carrier 20 is connected to the hub 9 together with the spring damper 15, and the sun gear 18 is connected to the stationary member 13. That is, the sun gear 18 may serve as a fixed element or a reaction element.

Figure 2:
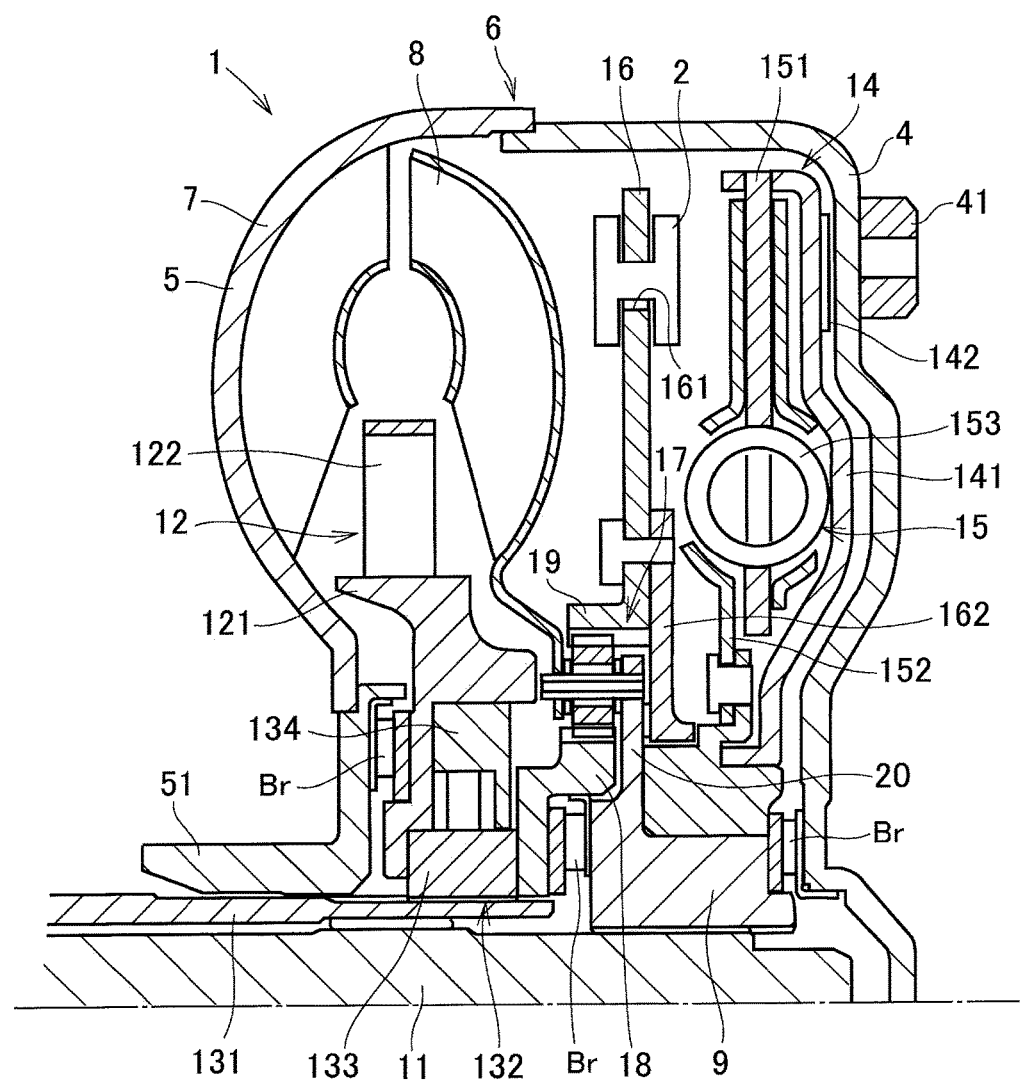
FIG. 2 is a cross-sectional view of the torsional vibration damper according to the preferred example.

Structures of the torque converter 1 and the planetary gear unit 17 are depicted in more detail in FIG. 2. The front cover 4 as a part of the casing 6 of the torque converter 1 comprises a disc shaped front wall, and a cylindrical portion extending axially from an outer circumference of the front wall. The front wall of the front cover 4 is connected to a drive plate (not shown) through a nut 41, and a leading end of the cylindrical portion of the front cover 4 is connected to the pump shell 5. The pump shell 5 has a hollow shaft 51 in its inner circumferential end connected to an oil pump (not shown).

The hollow shaft 51 is fitted onto a stator shaft 131 while being allowed to rotate therearound. Specifically, the stator shaft 131 as a fixed shaft is also a hollow shaft integrated with a housing (not shown) holding a transmission (not shown), and a leading end of the stator shaft 131 extends into an inner space of the casing 6.

The pump impeller 7 is arranged inside of the pump shell 5, and the turbine runner 8 is opposed to the pump impeller 7. Specifically, the turbine runner 8 comprises a shell and a plurality of blades attached to an inner face of the shell. The pump impeller 7 and the turbine runner 8 are substantially symmetrical to each other, and a clearance between the pump impeller 7 and the turbine runner 8 are gradually widened toward the inner circumferential side to ensure a space for arranging the stator 12 therebetween. The stator 12 is also fitted onto the aforementioned stator shaft 131 through a one-way clutch 132, and comprises an annular rim 121, and a plurality of blades 122 arranged around the annular rim 121. Each of the blades 122 are individually twisted in the same direction, and leading ends of the blades 122 are connected to one another. The stator 12 thus structured alters a flowing direction of the fluid flowing out of the turbine runner 8 given that a speed ratio between the pump impeller 7 and the turbine runner 8 is small. By contrast, when the speed ratio between the pump impeller 7 and the turbine runner 8 is increased, the stator 12 is rotated by the fluid flowing from the turbine runner 8 and hence the flowing direction of the fluid is not altered. To this end, the one-way clutch 132 is adapted to be brought into engagement to halt rotation of the stator 12 when the aforementioned speed ratio is small, and to allow the stator 12 to rotate when the aforementioned speed ratio is large. Specifically, an inner race 133 of the one-way clutch 132 is splined onto the stator shaft 131, and an outer race 134 of the one-way clutch 132 is engaged with an inner circumference of the rim 121 of the stator 12.

The input shaft 11 is inserted into the stator shaft 131 while being allowed to rotate. In order to deliver torque to the transmission 10, a leading end of the input shaft 11 protrudes from the stator shaft 131 to be splined to the hub 9. The planetary gear unit 17 serving as a speed increasing device is interposed between the hub 9 and the one-way clutch 132. As described, the planetary gear unit 17 is a single-pinion planetary gear unit comprising the sun gear 18, the ring gear 19 arranged concentrically around the sun gear 18, and the carrier 20 supporting planetary gears interposed between the sun gear 18 and the ring gear 19 in a rotatable and revolvable manner. The sun gear 18 comprises a disc portion, and an inner circumferential edge of the disc portion is splined onto the stator shaft 131. That is, the sun gear 18 is halted by the stator shaft 131 as a stationary member in such a manner not rotate.

The carrier 20 is integrated with the hub 9, and comprises a flange portion extending radially outwardly from the hub 9. An inner circumferential end of the shell of the turbine runner 8 is connected to the flange portion of the carrier 20 across the planetary gear. That is, the turbine runner 8 is connected to the hub 9 through the carrier 20.

The rotary member 16 is arranged around the ring gear 19 while holding the mass body 2 adapted to suppress vibrations by its inertial torque. According to the example shown in FIG. 2, the rotary member 16 is a disc plate member integral with the ring gear 19 while expanding radially outwardly. The mass body 2 as a rolling member comprises a shaft member and a pair of disc members attached to both ends of the shaft member. Therefore, as shown in FIG. 2, the mass body 2 has an "H" shaped cross-section. In order to hold a plurality of the mass body 2, the rotary member has same numbers of arcuate through holes 161 as the mass bodies 2. Width of each of the through hole 161 is slightly wider than a diameter of the shaft portion of the mass body 2, and the shaft portion of the mass body 2 is inserted into the through hole 161. An arcuate surface of radially outside of the through hole 161 serves as a raceway surface on which the mass body 2 rolls, and a curvature radius of the raceway surface is shorter than that of an outer circumference of the rotary member 16. In addition, a supporting plate 162 is attached to a radially inner portion of the rotary member 16, and an inner circumferential edge of the supporting plate 162 is fitted onto the hub 9.

The lock-up clutch 14 is interposed between the inner face of the front cover 4 and the rotary member 16. The lock-up clutch 14 comprises a lock-up piston 141 fitted onto the hub 9 while being allowed to rotate and to reciprocate axially, and a friction plate 142 attached to an outer circumferential area of the lock-up piston 141 to be opposed to the inner face of the front cover 4. The lock-up piston 141 is pushed toward the front cover 4 if the hydraulic pressure in the rotary member 16 side is greater than that in the front cover 4 side, and consequently the friction plate 142 is brought into contact to the inner face of the front cover 4 to transmit torque thereto.

The spring damper 15 is arranged between the lock-up piston 141 and the hub 9. The spring damper 9 comprises a drive member 151 connected to the lock-up piston 141, a driven member 152 connected to the hub 9, and a spring 153 providing an elastic connection between the drive member 151 and the driven member 152 to suppress vibrations by its circumferential compression. In addition, a bearing Br is interposed between the hub 9 and the front cover 4.

In the torque converter 1, torque of the engine 3 is applied to the casing 6, and the pump impeller 7 is rotated together with the casing 6. Consequently, a spiral flow of the fluid is created so that the turbine runner 8 is rotated by the spiral flow. Since the turbine runner 8 is connected to the carrier 20 of the planetary gear unit 17 and the carrier 20 is connected to the hub 9, torque of the turbine runner 8 is further delivered to the input shaft 11 via the carrier 20 and the hub 9. In this situation, the lock-up piston 141 is pushed toward the front cover 4 to bring the friction plate 142 into engagement with the inner face of the front cover 4. Consequently, the torque applied to the casing 6 is delivered to the input shaft 11 through the lock-up clutch 14, the spring damper 15, and the hub 9.

Thus, the torque is delivered to the input shaft 11 through the hub 9. As described, the hub 9 is connected to the carrier 20 so that the rotary member 16 is rotated by the torque delivered to the input shaft 11 at a speed higher than that of the input shaft 11. That is, in the planetary gear unit 17, torque is applied to the carrier 20 while halting the sun gear 18. For this reason, the planetary gear unit 17 is allowed to serve as a speed increasing device so that the ring gear 19 and the rotary member 16 integral therewith are rotated at a speed higher than that of the carrier engaged with the input shaft 11.

The mass body 2 held in the through hole 161 is oscillated within the through hole 161 by the pulsation of the torque applied to the input shaft 11 and the rotary member 16. In this situation, since the rotational speed of the rotary member 16 is increased by the planetary gear unit 17 serving as a speed increasing device, equivalent inertia of the mass body 2 is increased. For this reason, the mass body 2 is allowed to establish sufficient inertial torque to suppress vibrations even if an actual mass thereof is small. Consequently, the vibrations of the torque applied to the input shaft 11 via the hub 9 can be damped by the inertia torque of the oscillating mass body 2.

Thus, according to the preferred example, the rotary member 16 and the mass body 2 forming a mass damper and the planetary gear unit 17 are held in the torque converter 1 making use of an available inner space of the casing 6. In addition, since the sun gear 18 is connected to the stator shaft 131 extending along the rotational center of the torque converter 1 to be halted, the planetary gear unit 17 is allowed to serve as a speed increasing device without arranging an additional fixing member for halting a rotation of the rotary member of the planetary gear unit 17.

According to the preferred example, therefore, the torque converter 1 may be downsized entirely and the mass body 2 may also be downsized to be fitted easily into the torque converter 1. In addition, since the mass body 2 is exposed from the through hole 161 as illustrated in FIG. 2, the mass body 2 may be lubricated by the fluid in the casing 6 so that the mass body 2 is allowed to roll smoothly on the raceway surface while preventing seizure thereof. Further, since the planetary gear unit 17, the rotary member 16 and the mass body 2 are held in the casing 6 filled with the fluid, gear noise and rattling noise can be suppressed.

Figure 3:
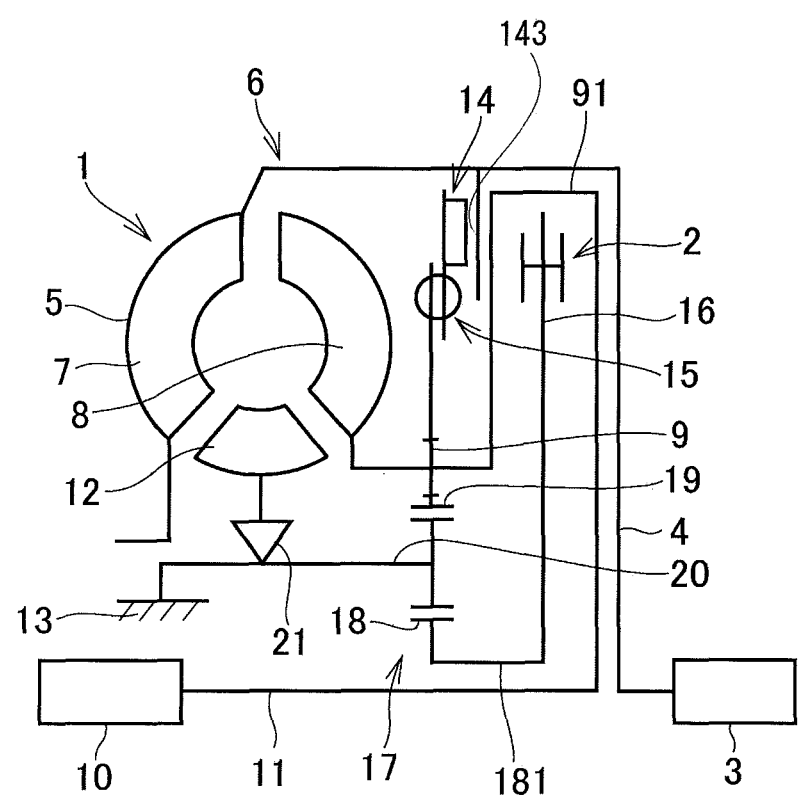
FIG. 3 is a skeleton diagram showing another example of the torsional vibration damper.

Turning to FIG. 3, there is shown an example to use the single-pinion planetary gear unit 17 as a speed increasing device by halting the ring gear 19 instead of the sun gear 18. In the example shown in FIG. 3, the carrier 20 is connected to the stationary member 13 to serve as the fixed element, the sun gear 18 is connected to the rotary member 16, and the ring gear is connected to the turbine runner 8 and the lock-up clutch 14. Remaining structures of the torque converter 1 are similar to those of the example shown in FIG. 1.

According to the example shown in FIG. 3, specifically, the lock-up clutch 14 is situated adjacent to the turbine runner 8, and the rotary member 16 is interposed between the lock-up clutch 14 and the front cover 4. In this example, an engagement face 143 to be brought into engagement with the lock-up clutch 14 hangs from a ceiling of the casing 6 toward the rotational center. The lock-up clutch 14 is connected to the hub 9 through the spring damper 15, and the hub 9 is connected to the turbine runner 8.

The sun gear 18 is integrated with a sun gear shaft 181 as a hollow shaft extending toward the front cover 4 while being fitted onto the input shaft 11. The rotary member 16 is connected to a leading end of the sun gear shaft 181 in such a manner to be rotated integrally therewith.

A connecting drum 91 is connected to the hub 9 to provide a connection between the hub 9 and the input shaft 11. To this end, the connecting drum 91 is shaped into a hollow structure covering the rotary member 16 entirely, and a lateral wall of the connecting drum 91 is connected to the input shaft 11 at the center. The carrier 20 is connected to the stationary member 13 to which the one-way clutch 21 is attached so that the carrier 20 may serve as a fixed element or a reaction element.

Thus, in the example shown in FIG. 3, the ring gear 19 serves as an input element, the carrier 20 serves as a fixed element, and the sun gear 18 serves as an output element, and hence the sun gear 18 is rotated in the direction opposite to the ring gear 19. Given that a gear ratio of the planetary gear unit 17 between tooth number of the sun gear 18 and tooth number of the ring gear 19 is "$\rho$", a rotational speed of the sun gear 18 can be expressed as "$1/\rho$". Since the gear ratio "$\rho$" is smaller than "1", the sun gear 18 and the rotary member 16 are rotated at a speed higher than that of the ring gear, the turbine runner 18 or the input shaft 11. For this reason, the planetary gear unit 17 is allowed to serve as a speed increasing device for rotating the rotary member 16 and the mass body 2 held therein at a speed higher than that of the input shaft 11 to increase the equivalent inertia of the mass body 2. Here, it is to be noted that the foregoing advantages of the example shown in FIGS. 1 and 2 may also be achieved by the example shown in FIG. 3.

Figure 4:
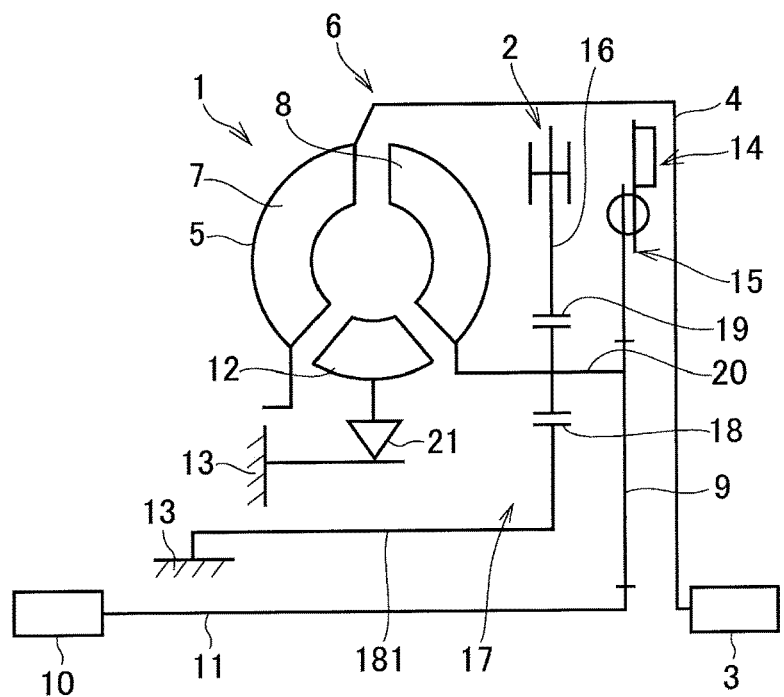
FIG. 4 is a skeleton diagram showing still another example of the torsional vibration damper.

Turning to FIG. 4, there is shown an example in which the casing 6 is used as the stationary member 13 to which the sun gear 18 is connected, instead of the member connected to the stator 12 or the stator shaft 131. According to the example shown in FIG. 4, the sun gear shaft 181 is fitted onto the input shaft 11 while being allowed to rotate relatively therewith, and the sun gear 18 is integrated with the sun gear shaft 181. An end portion of the sun gear shaft 181 opposite to the sun gear 18 is connected to a predetermined portion of the casing 6 or to a member connected to the casing 6. In this case, although the sun gear shaft 181 is additionally interposed between the stator shaft and the input shaft 11, vibrations on the input shaft 11 can be suppressed by the principle explained in the foregoing examples shown in FIGS. 1 and 2. In addition, the foregoing advantages of the example shown in FIGS. 1 and 2 may also be achieved by the example shown in FIG. 4.

Figure 5:
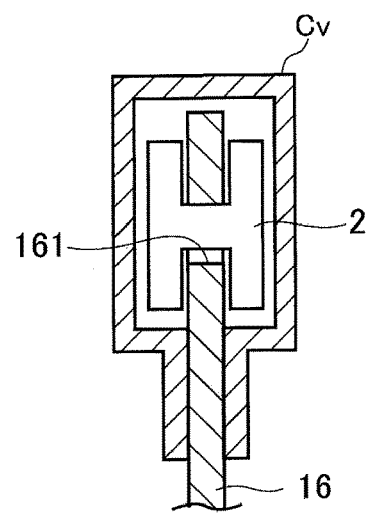
FIG. 5 is a partial cross-sectional view showing an example of covering an outer circumferential end of the rotary member in a liquid-tight condition while holding the mass body.

As described, the torsional vibration damper is adapted to suppress vibrations by the inertia torque of the mass body 2 resulting from an oscillating motion. In the torsional vibration damper, the mass body 2 is subjected to a centrifugal force and an inertia force, and a slight friction acts inevitably between the mass body 2 and the through hole 161. Therefore, vibration damping characteristics of the vibration damper is determined taking into consideration those factors. In order to allow the mass body 2 to oscillate accurately at the desired frequency, it is preferable to prevent the mass body 2 from being subjected to a resistance of the fluid. To this end, as shown in FIG. 5, it is effective to enclose an oscillating range of the mass body 2 in the rotary member 16 liquid-tightly by a cover Cv. In this case, the fluid will not intrude into the cover Cv so that the mass body 2 is allowed to oscillate without being subjected to the resistance of the fluid at the desired frequency.

In the example shown in FIG. 5, collision noise of the mass body 2 may result by a collision of the mass body 2 against an inner edge of the through hole 161 or an inner face of the cover Cv. However, such collision noise may be insulated by the cover Cv. In addition, since the planetary gear unit 17 serves as a speed increasing device, the rotational speed of the rotary member 16 will not be dropped frequently to a level at which the collision noise of the mass body 2 is caused. For this reason, the collision noise of the mass body 2 may be suppressed.

It is to be understood that the present application is not limited to the foregoing examples but includes various kinds of modifications as fall within the spirit of the present invention. For example, the planetary unit in which rollers are employed as the rotary members instead of gears may also be used as the planetary gear unit 17. In addition, a double-pinion planetary unit may also be used as the planetary gear unit 17. Further, the present invention may also be applied to a fluid coupling which does not have a torque multiplying function instead of the torque converter.

What is claimed is:

1. A torsional vibration damper having a mass body held in a rotary member in such a manner to be oscillated by torque pulse of the rotary member, wherein:
    the rotary member is arranged in an internal space of a fluid coupling in which a pump impeller, a turbine runner and a predetermined stationary member are held in a casing;
    a planetary unit that performs a differential action among three rotary elements is arranged in the casing;
    a first rotary element of the planetary unit is connected to the stationary member;
    a second rotary element of the planetary unit is connected to the rotary member; and
    a third rotary element of the planetary unit is connected to the turbine runner.

2. The torsional vibration damper as claimed in claim 1, wherein:
    a stator that alters a flowing direction of fluid flowing from the turbine runner toward the pump impeller is interposed between the turbine runner and the pump impeller; and
    the stationary member includes a fixed shaft supporting the stator.

3. The torsional vibration damper as claimed in claim 1, wherein:
    the planetary unit includes a single-pinion planetary gear unit comprising a sun gear, a ring gear arranged concentrically around the sun gear, and a carrier supporting planetary gears interposed between the sun gear and the ring gear;
    the first rotary element includes the sun gear connected to the stationary member;
    the second rotary element includes the ring gear connected to the rotary member; and
    the third rotary element includes the carrier connected to the turbine runner.

4. The torsional vibration damper as claimed in claim 1, wherein the mass body is enclosed liquid-tightly by a cover to be protected from the fluid in the casing.

* * * * *